(12) United States Patent
Wang et al.

(10) Patent No.: US 9,028,591 B2
(45) Date of Patent: May 12, 2015

(54) CLIMATE CONTROL SYSTEM HAVING MULTIPLE ADSORBERS AND A METHOD OF CONTROL

(71) Applicant: Ford Global Technologies, LLC, Dearborn, MI (US)

(72) Inventors: Kai Wang, Canton, MI (US); Christopher Mark Greiner, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 13/874,597

(22) Filed: May 1, 2013

(65) Prior Publication Data

US 2014/0326133 A1 Nov. 6, 2014

(51) Int. Cl.
*B01D 53/06* (2006.01)
*B01D 53/26* (2006.01)
*B60H 3/02* (2006.01)
*F25B 1/00* (2006.01)

(52) U.S. Cl.
CPC .............. *B01D 53/261* (2013.01); *B60H 3/024* (2013.01); *B60H 2003/028* (2013.01); *F25B 1/00* (2013.01)

(58) Field of Classification Search
CPC .. B01D 53/04; B01D 53/261; B01D 2257/80; B01D 2259/4566

USPC .......... 95/10, 14, 114, 115, 117, 148; 96/111, 96/112, 121, 126, 127, 146; 34/80, 472, 34/473; 454/156; 62/92

See application file for complete search history.

(56) References Cited

U.S. PATENT DOCUMENTS

| | | | | | |
|---|---|---|---|---|---|
| 2,124,932 | A | * | 7/1938 | Stark et al. | 96/111 |
| 2,248,225 | A | * | 7/1941 | Fonda | 96/111 |
| 4,419,835 | A | * | 12/1983 | Strain | 34/80 |
| 4,536,198 | A | * | 8/1985 | Strain | 95/125 |
| 5,509,275 | A | * | 4/1996 | Bhatti et al. | 62/271 |
| 5,620,367 | A | * | 4/1997 | Khelifa | 454/156 |
| 5,725,639 | A | * | 3/1998 | Khelifa et al. | 96/112 |
| 5,938,523 | A | * | 8/1999 | Khelifa et al. | 454/156 |
| 6,364,942 | B1 | * | 4/2002 | Felber et al. | 96/111 |
| 6,807,820 | B2 | | 10/2004 | Aikawa et al. | |
| 7,422,993 | B2 | | 9/2008 | Takewaki et al. | |
| 7,497,089 | B2 | | 3/2009 | Kakiuchi et al. | |
| 2005/0039481 | A1 | * | 2/2005 | Chant | 62/271 |

* cited by examiner

*Primary Examiner* — Frank Lawrence
(74) *Attorney, Agent, or Firm* — Vichit Chea; Brooks Kushman P.C.

(57) ABSTRACT

A climate control system and a method of control. The climate control system may have first and second adsorbers and a door that controls airflow through the first and second adsorbers. The first adsorber adsorbs moisture from the airflow and the second adsorber desorbs moisture when the door is in a first position.

20 Claims, 4 Drawing Sheets

CLIMATE CONTROL SYSTEM HAVING MULTIPLE ADSORBERS AND A METHOD OF CONTROL

TECHNICAL FIELD

This patent application relates to a climate control system having multiple adsorbers and a method of control.

BACKGROUND

A heat storage system for a vehicle having adsorbents is disclosed in U.S. Pat. No. 6,807,820.

SUMMARY

In at least one embodiment, a vehicle climate control system is provided. The system may include first and second adsorbers disposed in a housing and a door. The door may be disposed in the housing and may control airflow through the first and second adsorbers. The first adsorber may adsorb moisture from the airflow and the second adsorber may desorb moisture when the door is in a first position.

In at least one embodiment, a climate control system is provided. The climate control system may include first and second adsorbers and first and second doors. The first and second adsorbers may be disposed in first and second air passages, respectively. The first and second doors may be disposed proximate first and second ends of the first and second air passages, respectively. The first adsorber may adsorb moisture and the second adsorber may desorb moisture when the first and second doors block airflow through the second air passage.

In at least one embodiment, a method of controlling a climate control system is provided. The method may include positioning a first door in a first position to permit airflow through a first adsorber and inhibit airflow through a second adsorber. The second adsorber may be heated to desorb moisture while the first adsorber may not be heated and may adsorb moisture from the airflow.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
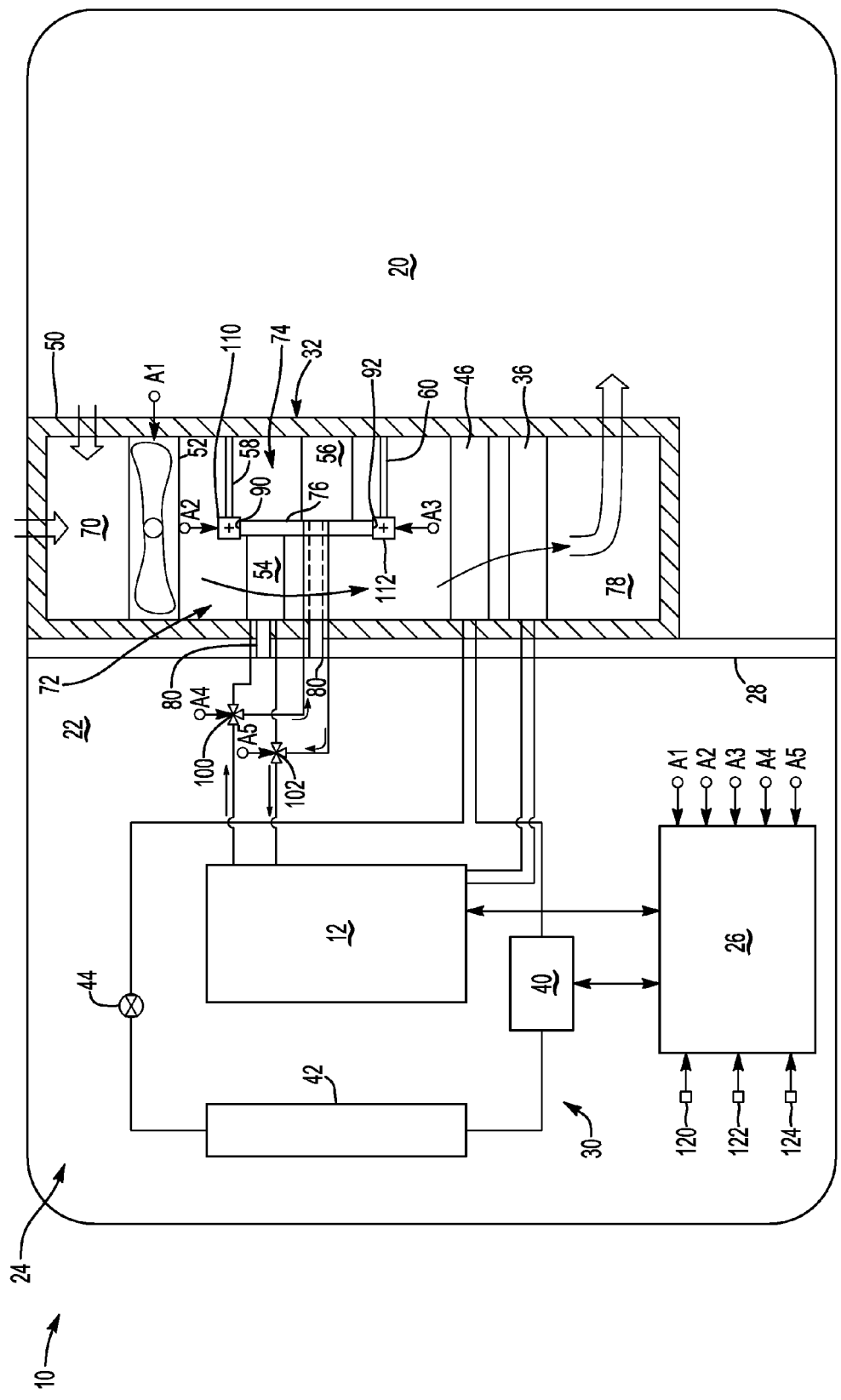
FIG. 1 is a schematic of an exemplary vehicle illustrating airflow through a first adsorber.

Referring to FIG. 1, a schematic representation of a vehicle 10 is shown. The vehicle 10 may be a motor vehicle, such as a car or truck.

Figure 4:
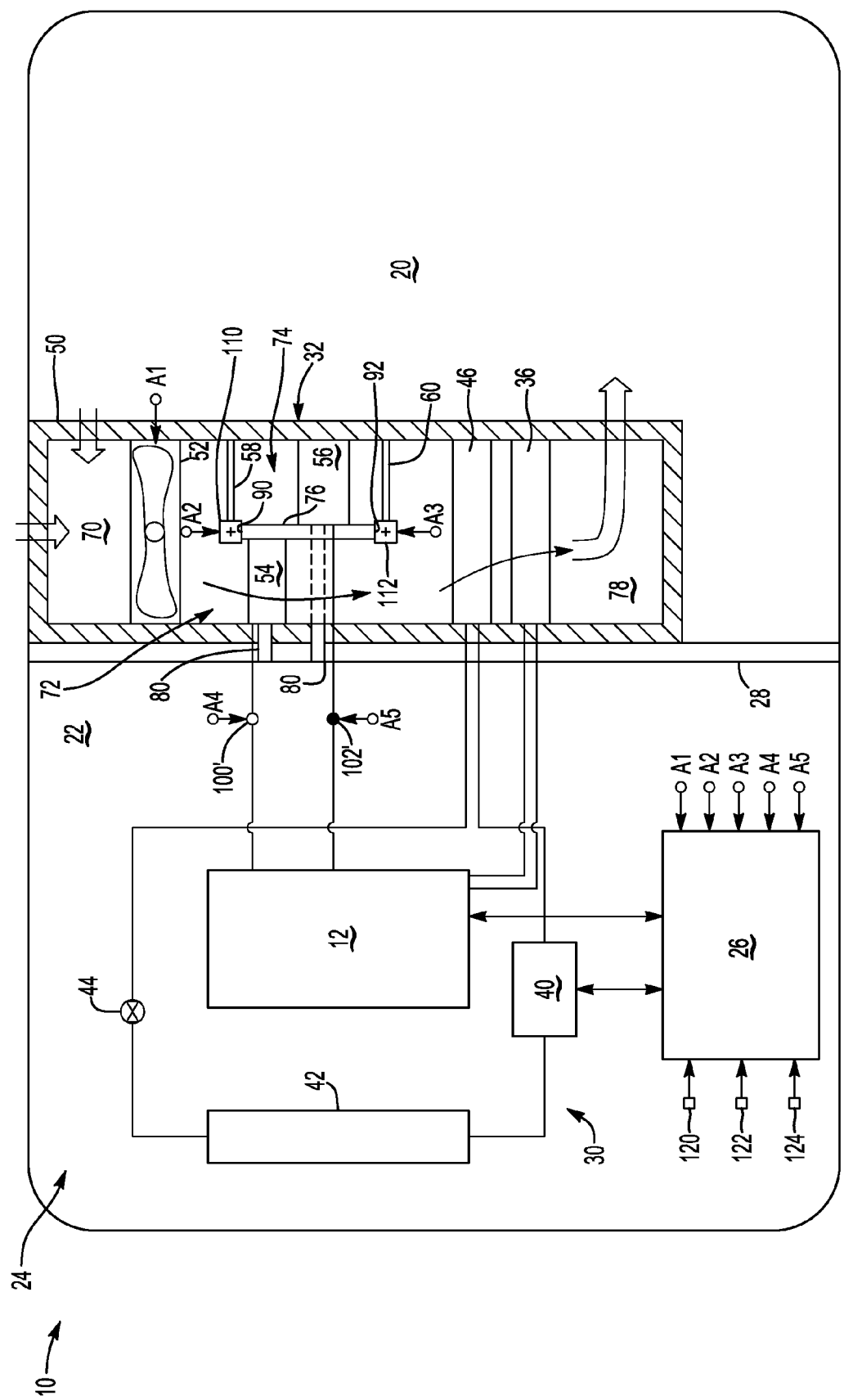
FIG. 4 is a schematic of another vehicle configuration.

The vehicle 10 may have any suitable drivetrain and may include one or more power sources 12 that may be used to propel the vehicle 10 and/or power vehicle components. In FIG. 1, a vehicle 10 is shown that has a single power source 12 that may be configured as an internal combustion engine that may be adapted to combust any suitable type of fuel, such as gasoline, diesel fuel, or hydrogen. Alternatively, the power source 12 may be an electrical power source, such as a battery, capacitor, generator, motor-generator or the like as shown in FIG. 4. As another option, vehicle 10 may be configured as a hybrid vehicle that may have a plurality of power sources 12, such as an electrical power source and a non-electrical power source.

The vehicle 10 may include a passenger compartment 20, an engine compartment 22, a climate control system 24, and at least one control module 26.

The passenger compartment 20 may be disposed inside the vehicle 10 and may receive one or more occupants. A portion of the climate control system 24 may be disposed in the passenger compartment 20.

The engine compartment 22 may be disposed proximate the passenger compartment 20. One or more power sources 12 may be disposed in the engine compartment 22 as well as a portion of the climate control system 24. The engine compartment 22 may be separated from the passenger compartment 20 by a bulkhead 28.

The climate control system 24 may circulate air and/or control or modify the temperature of circulated air in the passenger compartment 20. The climate control system 24 may include a heat pump subsystem 30 and a ventilation subsystem 32.

The heat pump subsystem 30 may transfer thermal energy to or from the passenger compartment 20. In at least one embodiment, the heat pump subsystem 30 may be configured as a vapor compression system in which a fluid is circulated through the heat pump subsystem 30 to transfer thermal energy to or from the passenger compartment 20. The direction of flow of the fluid may be reversible or non-reversible. A heat pump subsystem 30 having reversible flow may transfer heat from the passenger compartment (i.e., act as an air conditioner) and transfer heat to the passenger compartment 20 when the direction of fluid flow is reversed. A heat pump subsystem 30 that does not have reversible flow may be configured as an air conditioning system that circulates a refrigerant to transfer heat energy out of the passenger compartment 20. In such a configuration, heat may be transferred to the passenger compartment 20 via other components, such as a heater 36 that may receive energy from a power source 12. For example, in FIG. 1, the heater 36 may receive thermal energy from a fluid, such as a coolant, that is heated by the first power source 12 or engine as shown in FIG. 1. In FIG. 4, the heater 36 may not receive thermal energy from a fluid, but may be an electric or electrically powered heater like a resistance wire heater, a positive temperature coefficient (PTC) heater, or a thermoelectric device that may or may not be thermodynamically reversible. Examples of devices that may be thermodynamically reversible (or that may heat and cool air) include Peltier devices or devices that provide Peltier, Seebeck or Thomson effects. For brevity, an abbreviated discussion of the heat pump subsystem 30 is provided below that focuses on a vapor compression refrigeration cycle. In such a configuration, the heat pump subsystem 30 may include a pump 40, a first heat exchanger 42, an expansion device 44, and a second heat exchanger 46.

The pump 40 may pressurize and circulate a heat transfer fluid through the heat pump subsystem 30. The pump 40 may be called a compressor and the fluid may be called a refrigerant in an air conditioning or vapor compression refrigeration context. The pump 40 may be powered by an electrical or non-electrical power source. For example, the pump 40 may be operatively coupled to a power source 12 configured as an internal combustion engine via a belt or may be driven by an electrically powered motor.

The first heat exchanger 42 may be fluidly connected to the pump 40 via a conduit, such as a tube, hose or the like. The first heat exchanger 42 may be disposed outside the passenger compartment 20. In an air conditioning or vapor compression refrigeration context, the first heat exchanger 42 may be called a condenser and may transfer heat to the surrounding environment to condense the fluid or refrigerant from a vapor to liquid. A receiver-dryer may be provided with the first heat exchanger 42 in one or more embodiments. The receiver-dryer may act as a reservoir and may include a desiccant that absorbs small amounts of water moisture from the fluid. Alternatively, the receiver-drier may be a separate component that is fluidly connected to the first heat exchanger 42.

The expansion device 44 may be fluidly connected to the first heat exchanger 42. The expansion device 44 may be provided to alter the pressure of the fluid. In an air conditioning or vapor compression refrigeration context, the expansion device 44 may be an orifice tube or thermal expansion valve (TXV) that may reduce the pressure of the fluid received from the first heat exchanger 42.

The second heat exchanger 46 may be fluidly connected to the expansion device 44. The second heat exchanger 46 may be disposed inside the passenger compartment 20. In an air conditioning or vapor compression refrigeration context, the second heat exchanger 46 may be called an evaporator and may receive heat from air in the passenger compartment 20 to vaporize the fluid, thereby causing the fluid to change from a liquid to a vapor. The vaporized fluid may then be provided to the pump 40 to repeat the cycle.

The ventilation subsystem 32 may circulate air in the passenger compartment 20 of the vehicle 10. The ventilation subsystem 32 may have a housing 50, a blower 52, a first adsorber 54, a second adsorber 56, a first door 58, and a second door 60.

The housing 50 may receive components of the ventilation subsystem 32. In FIGS. 1-4, the housing 50 is illustrated such that internal components are visible rather than hidden for clarity. In addition, airflow through the housing 50 and internal components are represented by the arrowed lines. The housing 50 may be at least partially disposed in the passenger compartment 20. For example, the housing 50 or a portion thereof may be disposed under an instrument panel of the vehicle 10. The housing 50 may have an air intake portion 70, a first air passage 72, a second air passage 74, a divider wall 76, and a plenum 78 and one or more drain outlets 80.

The air intake portion 70 may provide air to the ventilation subsystem 32. The air intake portion 70 may receive air from outside the vehicle 10 and/or air from inside the passenger compartment 20. For example, the air intake portion 70 may receive ambient air from outside the vehicle 10 via an intake passage, duct, or opening that may be located in any suitable location, such as proximate a cowl, wheel well, or other vehicle body panel. The air intake portion 70 may also receive air from inside the passenger compartment 20 and recirculate such air through the ventilation subsystem 32. One or more doors or louvers may be provided to permit or inhibit air recirculation.

The first air passage 72 may be provided in the housing 50 between the blower 52 and the plenum 78. As such, the first air passage 72 may be configured to direct airflow from the blower 52 toward the plenum 78. In FIG. 1, the first air passage 72 is disposed between the blower 52 and the second heat exchanger 46.

The second air passage 74 may also be provided in the housing 50 between the blower 52 and the plenum 78. As such, the second air passage 74 may be configured to direct airflow from the blower 52 toward the plenum 78. In FIG. 1, the second air passage 74 is also disposed between the blower 52 and the second heat exchanger 46. The second air passage 74 may have substantially the same configuration and/or volume as the first air passage 72 in one or more embodiments. In addition, the second air passage 74 may be disposed parallel to the first air passage 72.

The divider wall 76 may at least partially define the first and second air passages 72, 74. Moreover, the divider wall 76 may separate the first air passage 72 from the second air passage 74. As such, the divider wall 76 may inhibit air that passes through the first air passage 72 from entering the second air passage 74 and vice versa. The divider wall 76 may have a first end 90 and a second end 92. The first end 90 may be disposed proximate the blower 52 and between the blower 52 and the first and second adsorbers 54, 56. The first end 90 may be spaced apart from the blower 52 in one or more embodiments. The second end 92 may be disposed opposite the first end 90 and may be disposed near the second heat exchanger 46. The second end 92 may be spaced apart from the second heat exchanger 46 to facilitate airflow distribution across the second heat exchanger 46.

The plenum 78 may be disposed downstream of the first and second air passages 72, 74. The plenum 78 may receive or may be disposed proximate the heater 36 and the second heat exchanger 46. In addition, the plenum 78 may direct air to one or more outlets to distribute air in the passenger compartment 20. In FIGS. 1-4, a simplified representation of the plenum 78 is shown in which one or more mode doors that direct air to particular outlets, such as a defrost outlet, side window demisters, register vents, or floor vents, are not shown for clarity. In addition, a temperature door that may control airflow between the heater 36 and second heat exchanger 46 is not shown.

One or more drain outlets 80 may be provided with the housing 50. A drain outlet 80 may permit water to drain from and exit the housing 50 and the passenger compartment 20. Water may accumulate in the housing 50 due to operation of the heat pump subsystem 30 and/or the first and second adsorbers 54, 56. For example, water may collect on the second heat exchanger 46 when air passing through the housing 50 is cooled by the second heat exchanger 46. In addition, water may be released from the first and second adsorbers 54, 56 during a desorption phase as will be discussed in more detail below. Common or separate drain outlets 80 may be provided for the second heat exchanger 46, first adsorber 54, and second adsorber 56. A drain outlet 80 may be disposed proximate the bottom of the housing 50 and may extend through the bulkhead 28. In addition, some air may also exit the housing 50 via the drain outlet 80.

The blower 52 may be provided to circulate air through the ventilation subsystem 32. The blower 52 may be configured as a fan or blower wheel that may be rotated by an electric motor. The blower 52 may be located between the air intake portion 70 and the first and second air passages 72, 74.

The first and second adsorbers 54, 56 may be provided to dehumidify air. The first and second adsorbers 54, 56 may have substantially similar or identical configurations. The first and second adsorbers 54, 56 may each be made of a material that is coated with a hygroscopic adsorbent that may have a plurality of air passages that permit airflow through the first and second adsorbers 54, 56. The air passages may provide a large amount of surface area between the air and the adsorbent to facilitate dehumidification. Air may be dehumidified by exposure to the adsorbent in a nearly adiabatic process. As such, the air passing through the first or second adsorbers 54, 56 may have a substantially constant thermodynamic wet bulb temperature during the dehumidification process. The first and second adsorbers 54, 56 may have an adsorption phase and a desorption phase. The first and second adsorbers 54, 56 may not be heated during adsorption or the adsorption phase and may be heated during desorption or the desorption phase. Humidity and latent heat load may be removed from air flowing through an adsorber during the adsorption phase. Humidity may be released from the adsorber during the desorption phase. Humidity may be released in the form of a liquid and may exit the housing 50 through a drain outlet 80.

The first adsorber 54 may be disposed in the first air passage 72. The first adsorber 54 may adsorb moisture from airflow or air flowing through the first air passage 72 when in the adsorption phase and may desorb moisture when in the desorption phase. The first adsorber 54 may be fluidly connected to at least one valve or switch that control heating of the first adsorber 54. In the embodiment shown in FIG. 1, the first adsorber 54 is fluidly connected to a first valve 100 and a second valve 102 that control the flow of a fluid, such as engine coolant, to the first adsorber 54. The first valve 100 and/or second valve 102 may inhibit the flow of heated engine coolant to the first adsorber 54 during the adsorption phase. The first valve 100 and/or second valve 102 may permit the flow of heated engine coolant to the first adsorber 54 to heat the first adsorber 54 and facilitate the release of moisture during the desorption phase. In the embodiment shown in FIG. 4, the first adsorber 54 may be electrically connected to a first switch 100' that may control the flow of current that may be used to heat the first adsorber 54. The first switch 100' may be opened such that current is not provided to heat the first adsorber 54 during the adsorption phase and may be closed such that current may be provided to heat the first adsorber 54 during the desorption phase.

The second adsorber 56 may be disposed in the second air passage 74. As such, the first and second adsorbers 54, 56 may be disposed on opposite sides of the divider wall 76. In FIG. 1, the second adsorber 56 is shown offset from the first adsorber 54 for clarity, but could be aligned with first adsorber 54 in one or more embodiments. The second adsorber 56 may adsorb moisture from airflow or air flowing through the second air passage 74 when in the adsorption phase and may desorb moisture when in the desorption phase. The second adsorber 56 may be fluidly connected to at least one valve or switch that control heating of the second adsorber 56. In the embodiment shown in FIG. 1, the second adsorber 56 is fluidly connected to a first valve 100 and a second valve 102 that control the flow of a fluid, such as engine coolant, to the second adsorber 56. The first valve 100 and/or second valve 102 may inhibit the flow of heated engine coolant to the second adsorber 56 during the adsorption phase. The first valve 100 and/or second valve 102 may permit the flow of heated engine coolant to the second adsorber 56 to heat the second adsorber 56 and facilitate the release of moisture during the desorption phase. In the embodiment shown in FIG. 4, the second adsorber 56 may be electrically connected to a second switch 102' that may control the flow of current that may be used to heat the second adsorber 56. The second switch 102' may be opened such that current is not provided to heat the second adsorber 56 during the adsorption phase and may be closed such that current may be provided to heat the second adsorber 56 during the desorption phase.

The first door 58 may control airflow through the first air passage 72 and the second air passage 74. As such, the first door 58 may control airflow through the first and second adsorbers 54, 56. The first door 58 may be disposed proximate a first end of the first and second air passages 72, 74. For example, the first door 58 may be disposed proximate the first end 90 of the divider wall 76. The first door 58 may move between a first position and a second position. In FIGS. 1 and 4, the first door 58 is shown in a first position in which the first door 58 permits airflow through the first air passage 72 and the first adsorber 54 and blocks or inhibits airflow through the second air passage 74 and the second adsorber 56. As such, the first adsorber 54 may adsorb moisture from the airflow through the first air passage 72 and the second adsorber 56 may desorb moisture when the first door 58 is in the first position.

Figure 2:
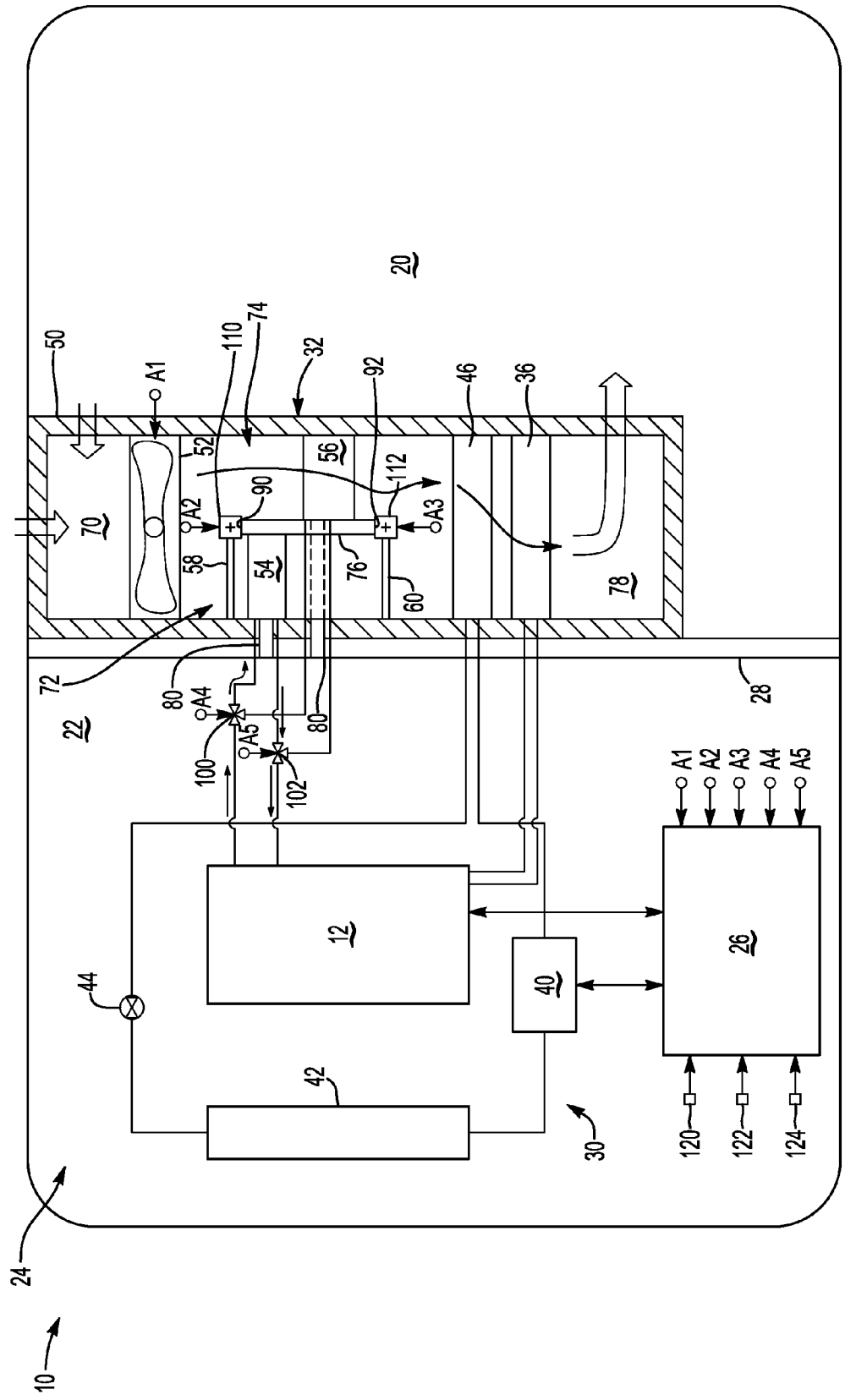
FIG. 2 is a schematic illustrating airflow through a second adsorber.

In FIG. 2, the first door 58 is shown in a second position in which the first door 58 inhibits airflow through the first air passage 72 and the first adsorber 54 and permits airflow through the second air passage 74 and the second adsorber 56. As such, the second adsorber 56 may adsorb moisture from the airflow through the second air passage 74 and the first adsorber 54 may desorb moisture when the first door 58 is in the second position.

Figure 3:
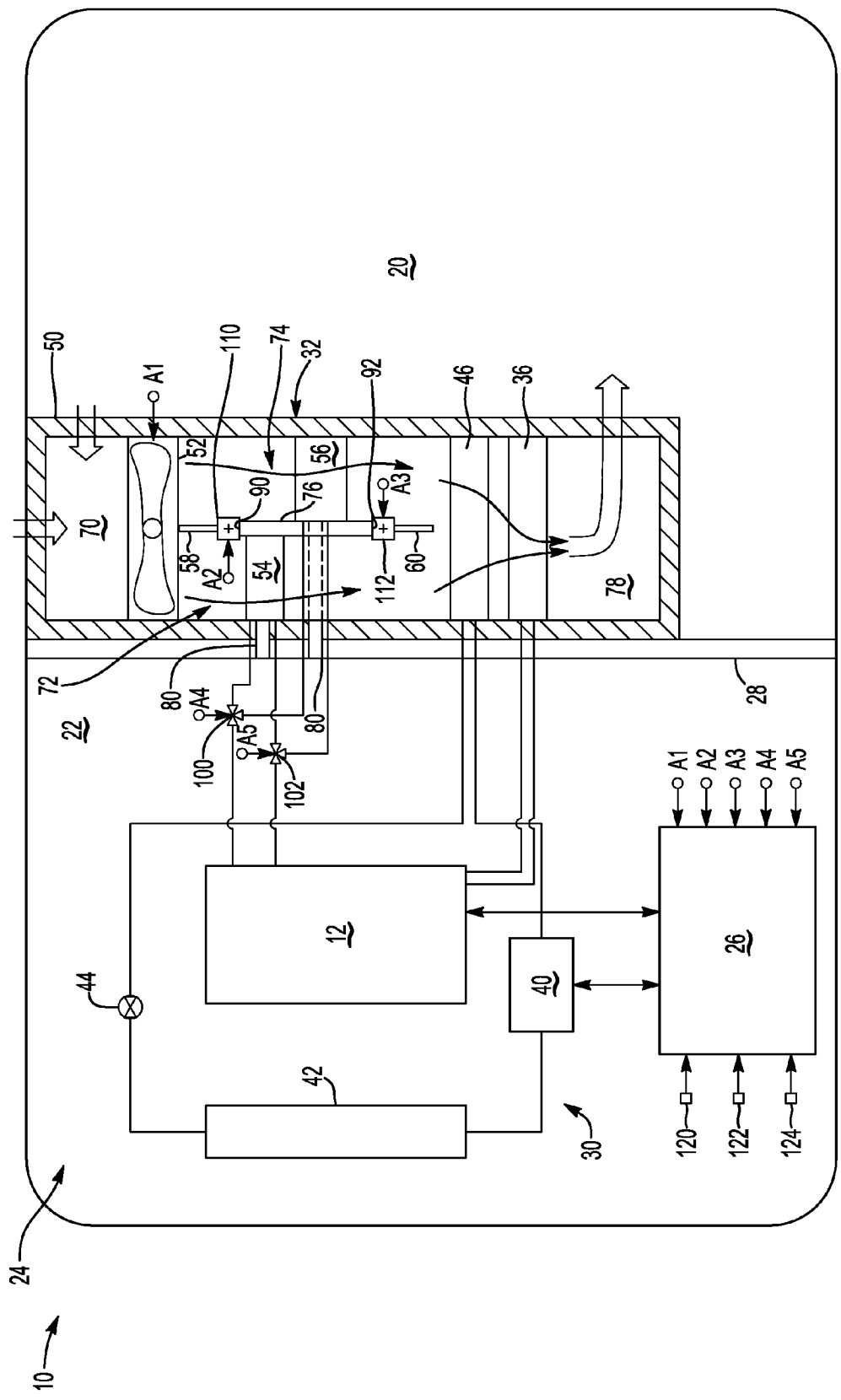
FIG. 3 is a schematic illustrating airflow through first and second adsorbers.

In FIG. 3, the first door 58 is shown in an intermediate position in which the first door 58 permits airflow through the first air passage 72 and the second air passage 74.

The first door 58 may be coupled to a first door actuator 110. The first door actuator 110 may actuate the first door 58 to a desired position in any suitable manner. In FIGS. 1-3, the first door actuator 110 rotates the first door 58 about an axis, but it is also contemplated that the first door 58 may not rotate and may move in another manner, such as by sliding or moving linearly.

The second door 60, if provided, may control airflow through the first air passage 72 and the second air passage 74. More specifically, the second door 60 may inhibit backflow of air through the first and second air passages 72, 74 to help isolate an adsorber that is in the desorption phase to inhibit moisture being desorbed from humidifying airflow through the housing 50, and/or inhibit a heated adsorber from heating or adding thermal energy to the air flowing through the housing 50. The second door 60 may be dispose proximate a second end of the first and second air passages 72, 74. For example, the second door 60 may be disposed proximate the second end 92 of the divider wall 76.

The second door 60 may move between a first position and a second position. In FIGS. 1 and 4, the second door 60 is shown in a first position in which the second door 60 permits airflow through the first air passage 72 and the first adsorber 54 and blocks or inhibits airflow or the backflow of air through the second air passage 74 toward the second adsorber 56 and first door 58. As such, the first adsorber 54 may adsorb moisture from the airflow through the first air passage 72 and the second adsorber 56 may desorb moisture when the second door 60 is in the first position.

In FIG. 2, the second door 60 is shown in a second position in which the second door 60 inhibits airflow through the first air passage 72 and the first adsorber 54 and permits airflow through the second air passage 74 and the second adsorber 56. As such, the second adsorber 56 may adsorb moisture from the airflow through the second air passage 74 and the first adsorber 54 may desorb moisture when the second door 60 is in a second position.

In FIG. 3, the second door 60 is shown in an intermediate position in which the second door 60 permits airflow through the first air passage 72 and the second air passage 74.

The second door 60 may be coupled to a second door actuator 112. The second door actuator 112 may actuate the second door 60 to a desired position in any suitable manner. In FIGS. 1-3, the second door actuator 112 rotates the second door 60 about an axis, but it is also contemplated that the first door 58 may not rotate and may move in another manner, such as by sliding or moving linearly.

One or more controllers or control modules 26 may be provided to monitor and control various components and systems of the vehicle 10 and/or climate control system 24. For example, the control module 26 may be electrically connected to or may communicate with the power source 12 and pump 40 as represented by the double arrowed lines. The control module 26 may be connected to our communicate with components of the climate control system 24, such as the blower 52, first valve 100, second valve 102, first door actuator 110, and the second door actuator 112. Connections between these components are represented by nodes A1 through A5, respectively. In addition, the control module 26 may also process input signals or data from various input devices or sensors. These input devices may include ambient air temperature sensor 120, a humidity sensor 122, and a coolant temperature sensor 124.

The ambient air temperature sensor 120 may detect or provide data indicative of a temperature of ambient air in the environment surrounding or in proximity to the vehicle 10. The ambient air temperature sensor 120 may be a physical sensor that may be disposed on the vehicle 10 or a virtual sensor. For example, a virtual ambient air temperature sensor may be based on temperature data that may be wirelessly transmitted to the vehicle 10. Such temperature data may be based on the location of the vehicle 10, which may be provided by a global positioning system (GPS) or other location telemetric data.

The humidity sensor 122 may be configured to detect the humidity of air in the passenger compartment 20. The humidity sensor 122 may be provided with the climate control system 24 in one or more embodiments.

The coolant temperature sensor 124 may detect or provide data indicative of the temperature of coolant that may circulate through and cool a power source 12, such as an engine of the vehicle 10. The coolant temperature sensor 124 may be disposed in the engine, radiator, or conduits such as tubes or hoses that may fluidly connect components through which coolant may circulate.

Referring to FIGS. 1-4, operation of the climate control system 24 will be discussed in more detail.

In FIG. 1, the climate control system 24 is shown with the first and second doors 58, 60 in the first position. In the first position, airflow is permitted through the first adsorber 54 and inhibited through the second adsorber 56. In addition, the first and second valves 100, 102 may be positioned to inhibit coolant flow to the first adsorber 54 and permit coolant flow to the second adsorber as represented by the arrowed lines near the first and second valves 100, 102. (In FIG. 4, the first and second switches 100', 102' replace the first and second valves 100, 102.) As such, the first adsorber 54 is in the adsorption mode and is not heated and the second adsorber 56 is in the desorption mode and is heated. In this operative configuration, the first adsorber 54 will continue to adsorb moisture until saturated and the second adsorber 56 will release moisture until it is desaturated.

The first and second doors 58, 60 may be actuated to the second position as shown in FIG. 2 when the first adsorber 54 is saturated and/or the second adsorber 56 is desaturated. In the second position, airflow is permitted through the second adsorber 56 and inhibited through the first adsorber 54. In addition, the first and second valves 100, 102 may be positioned to inhibit coolant flow to the second adsorber 56 and permit coolant flow to the first adsorber 54 as represented by the arrowed lines near the first and second valves 100, 102 in FIG. 2. As such, the second adsorber 56 is in the adsorption mode and is not heated and the first adsorber 54 is in the desorption mode and is heated.

The first and second doors 58, 60 may be actuated when a door actuation condition exists. A door actuation condition may be present when an adsorber is saturated or substantially desaturated. A determination as to whether the first adsorber 54 is saturated or the second adsorber 56 is desaturated, or vice versa, may be facilitated by the control module 26. A determination as to whether an adsorber is saturated or desaturated may be based on ambient air temperature, humidity, coolant temperature, and optionally blower speed. Ambient air temperature data or an ambient air temperature value may be provided by the ambient air temperature sensor 120. Humidity data or a humidity value may be provided by the humidity sensor 122. Coolant temperature data or a coolant temperature value may be provided by the coolant temperature sensor 124. Ambient air temperature, humidity, coolant temperature, and optionally blower speed may be used to look up a saturation time value or a desaturation time value from a lookup table. For example, saturation times and/or desaturation times for an adsorber may be determined during vehicle development testing for multiple ambient air temperature, humidity, coolant temperature, and optionally blower speed values.

The first and second doors 58, 60 may toggle from the second position back to the first position and first and second valves 100, 102 may return to the operative state shown in FIG. 1 when the second adsorber 56 becomes saturated or the first adsorber 54 becomes saturated. As such, airflow through the housing 50 may be continuously dehumidified by an adsorber.

The first and second doors 58, 60 may move to the intermediate position shown in FIG. 3 when dehumidification of the airflow is not desired. Dehumidification may not be desired when the humidity of air passing through the housing 50 or a relative humidity value is less than a threshold humidity value. The relative humidity value may be based on data from the humidity sensor 122. A threshold humidity value may be determined based on vehicle development testing. The first and second valves 100, 102 or first and second switches 100', 102' may be closed or cooperate to inhibit heating of the first and second adsorbers 54, 56 when the first and second doors 58, 60 are in the intermediate position. As such, the first and second adsorbers 54, 56 may dehumidify air flowing through the housing 50. Opening the first and second doors 58, 60 may increase airflow through the housing 50 as air may flow simultaneously through the first and second air passages 72, 74. In addition, a sufficiently low humidity level may allow the climate control system 24 to operate without turning on the heat pump subsystem 30 in an air conditioning mode to cool the second heat exchanger 46. For example, in a defrost mode, air conditioning may be activated to dehumidify air passing through the housing 50 to inhibit fogging of vehicle windows. Operation of the air conditioning system requires energy and increases the load on one or more power sources 12, which in turn may decrease fuel economy. Thus, power requirements may be decreased and fuel economy may be improved when one or more adsorbers may be utilized to dehumidify air in comparison air conditioning operation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle climate control system comprising:
a door and first and second adsorbers disposed in a housing;
wherein the first and second adsorbers adsorb and desorb moisture, respectively, when the door permits airflow through the first adsorber and inhibits airflow through the second adsorber and engine coolant is provided to the second adsorber but not the first adsorber.

2. The system of claim 1 wherein the first adsorber is not heated and the second adsorber is heated by the engine coolant when the door is in a first position.

3. The system of claim 1 wherein the first and second adsorbers desorb and adsorb moisture, respectively, from the airflow when the door permits airflow through the second adsorber and inhibits airflow through the first adsorber and engine coolant is provided to the first adsorber but not the second adsorb.

4. The system of claim 3 wherein the door permits airflow through the second adsorber and inhibits airflow through the first adsorber when in a second position.

5. The system of claim 4 wherein the second adsorber adsorbs moisture from the airflow and the first adsorber desorbs moisture when the door is in the second position.

6. The system of claim 4 wherein the second adsorber is not heated and the first adsorber is heated by the engine coolant when the door is in the second position.

7. The system of claim 1 wherein the first and second adsorbers are disposed in first and second air passages that are disposed parallel to each other.

8. The system of claim 7 wherein the housing includes a divider wall that at least partially defines the first and second air passages, wherein the first and second adsorbers are disposed on opposite sides of the divider wall.

9. The system of claim 8 wherein the door is disposed proximate a first end of the divider wall that is disposed between a blower and the first and second adsorbers.

10. A climate control system comprising:
first and second adsorbers disposed in first and second air passages, respectively; and
first and second doors disposed proximate first and second ends of the first and second air passages, respectively;
wherein the first adsorber adsorbs moisture and the second adsorber desorbs moisture when the first and second doors block airflow through the second air passage; and
wherein the first and second doors are positioned in an intermediate position to permit airflow from an air intake through the first and second adsorbers when a humidity value is less than a threshold humidity value.

11. The system of claim 10 wherein the second adsorber adsorbs moisture and the first adsorber desorbs moisture when the first and second doors block airflow through the first air passage.

12. The system of claim 10 further comprising a divider wall that is disposed between the first and second adsorbers and that at least partially defines the first and second air passages, wherein the first and second doors are disposed at opposite ends of the divider wall.

13. A method of controlling a climate control system comprising:
positioning a first door to permit airflow through a first adsorber and inhibit airflow through a second adsorber and heating the second adsorber to desorb moisture while the first adsorber is not heated and adsorbs moisture;
positioning the first door to permit airflow through first and second adsorbers and not heating first and second adsorbers when a humidity value is less than a threshold humidity value.

14. The method of claim 13 further comprising actuating the first door to a second position to permit airflow through the second adsorber and inhibit airflow through the first adsorber when the first adsorber is saturated.

15. The method of claim 13 further comprising actuating the first door to a second position to permit airflow through the second adsorber and inhibit airflow through the first adsorber when the second adsorber is desaturated.

16. The method of claim 13 further comprising actuating the first door to a second position to permit airflow through the second adsorber and inhibit airflow through the first adsorber when a door actuation condition is present, wherein the door actuation condition is based on an ambient air temperature, relative humidity, and coolant temperature.

17. The method of claim 13 wherein a second door is positioned to permit airflow through the first adsorber and inhibit airflow exiting the first adsorber from flowing through the second adsorber when the first door is in a first position.

18. The method of claim 17 wherein the second door is positioned to permit airflow through the second adsorber and inhibit airflow exiting the second adsorber from flowing through the first adsorber when the second door is in a second position.

19. The method of claim 13 further comprising providing engine coolant to the second adsorber but not the first adsorber when the first door is positioned to permit airflow through the first adsorber and inhibit air through the second adsorber.

20. The method of claim 13 wherein a heat exchanger is disposed in a housing downstream of the first and second adsorbers, wherein a pump is not operated to cool airflow through the heat exchanger when the humidity value is less than the threshold humidity value.

* * * * *